United States Patent
Fujimoto et al.

(10) Patent No.: US 10,618,743 B2
(45) Date of Patent: Apr. 14, 2020

(54) STAGGERED TYPE CONVEYOR CHAIN

(71) Applicant: FANUC CORPORATION, Yamanashi (JP)

(72) Inventors: Takeshi Fujimoto, Yamanashi-ken (JP); Hideyuki Watanabe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/267,640

(22) Filed: Feb. 5, 2019

(65) Prior Publication Data

US 2019/0248595 A1 Aug. 15, 2019

(30) Foreign Application Priority Data

Feb. 9, 2018 (JP) ................................. 2018-021869

(51) Int. Cl.
*B65G 39/20* (2006.01)
*B65G 17/38* (2006.01)

(52) U.S. Cl.
CPC ............. *B65G 39/20* (2013.01); *B65G 17/38* (2013.01)

(58) Field of Classification Search
CPC ........ B65G 39/20; B65G 17/24; B65G 17/38; B65G 17/385; B65G 17/40; B65G 17/42; B65G 17/44
See application file for complete search history.

(56) References Cited

U.S. PATENT DOCUMENTS

| | | | | |
|---|---|---|---|---|
| 4,293,064 A | * | 10/1981 | Robinson | B65G 13/00 198/779 |
| 4,836,357 A | * | 6/1989 | Focke | B65G 47/268 198/779 |
| 5,157,912 A | * | 10/1992 | Yoshiga | F16G 13/18 474/224 |
| 5,199,549 A | * | 4/1993 | Lutke | B65G 19/10 198/520 |
| 5,697,206 A | | 12/1997 | Otani et al. | |
| 6,190,278 B1 | | 2/2001 | Merelli et al. | |
| 9,862,575 B2 | * | 1/2018 | Schulz | B66B 23/145 |
| 9,932,206 B2 | * | 4/2018 | Matheisl | B65G 17/067 |
| 2009/0188778 A1 | * | 7/2009 | Fujiwara | B65G 39/20 198/851 |

FOREIGN PATENT DOCUMENTS

| | | |
|---|---|---|
| JP | S6238206 U | 3/1987 |
| JP | 08-277886 A | 10/1996 |
| JP | 2000-55139 A | 2/2000 |
| JP | 2008-298187 A | 12/2008 |
| JP | 2015-232352 A | 12/2015 |
| JP | 2016048105 A | 4/2016 |

* cited by examiner

*Primary Examiner* — William R Harp
(74) *Attorney, Agent, or Firm* — Robert P. Michal, Esq.; Carter, DeLuca & Farrell LLP

(57) ABSTRACT

A staggered type conveyor chain includes: a chain extending in a serial direction; plural side rollers arranged in a staggered manner on both sides of the chain in the serial direction; and plural suppressing members, each arranged to be paired with the side roller across the chain in a staggered manner on either side of the chain in the serial direction, and configured to suppress entrance of foreign material interfering with the side rollers into a space between the neighboring side rollers with respect to the serial direction.

11 Claims, 4 Drawing Sheets

STAGGERED TYPE CONVEYOR CHAIN

CROSS-REFERENCE TO RELATED APPLICATION

This application is based upon and claims the benefit of priority from Japanese Patent Application No. 2018-021869 filed on Feb. 9, 2018, the contents of which are incorporated herein by reference.

BACKGROUND OF THE INVENTION

Field of the Invention:
The present invention relates to a staggered type conveyor chain in which side rollers are arranged in a staggered manner on both sides.

Description of the Related Art:
Japanese Laid-Open Patent Publication No. 08-277886 discloses a conveyor chain which is formed of a plurality of pairs of inner plates and a plurality of pairs of outer plates connected to one another in series by coupling pins so as to run continuously around and further includes side rollers arranged in a staggered manner in the serial direction thereof.

SUMMARY OF THE INVENTION

In the conveyor chain of Japanese Laid-Open Patent Publication No. 08-277886, side rollers are arranged in a staggered manner on both sides of the chain along the serial direction of the chain. Therefore, as compared with the configuration in which side rollers are arranged on both sides of the chain so as to oppose each other across the chain, a large gap tends to be formed between the neighboring side rollers in the serial direction. For this reason, foreign material may enter the gap between the neighboring side rollers in the serial direction of the chain, so there is a fear that the traveling of the chain is unintentionally stopped.

It is therefore an object of the present invention to provide a staggered type conveyor chain that can suppress an inadvertent stoppage of traveling.

A staggered type conveyor chain includes: a chain extending in a serial direction; a plurality of side rollers arranged in a staggered manner on both sides of the chain in the serial direction; and a plurality of suppressing members, each arranged to be paired with the side roller across the chain in a staggered manner on either side of the chain in the serial direction, and configured to suppress entrance of foreign material interfering with the side rollers into a space between the neighboring side rollers with respect to the serial direction.

In the conveyor chain of the above aspect, the suppressing member prevents foreign material that interferes with the side roller from entering into a space between the neighboring side rollers in the serial direction. Therefore, according to the conveyor chain of the above mode, it is possible to suppress an inadvertent stoppage of traveling.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The staggered type conveyor chain according to the present invention will be detailed below by describing preferred embodiments with reference to the accompanying drawings.

[Embodiment]

Figure 1:
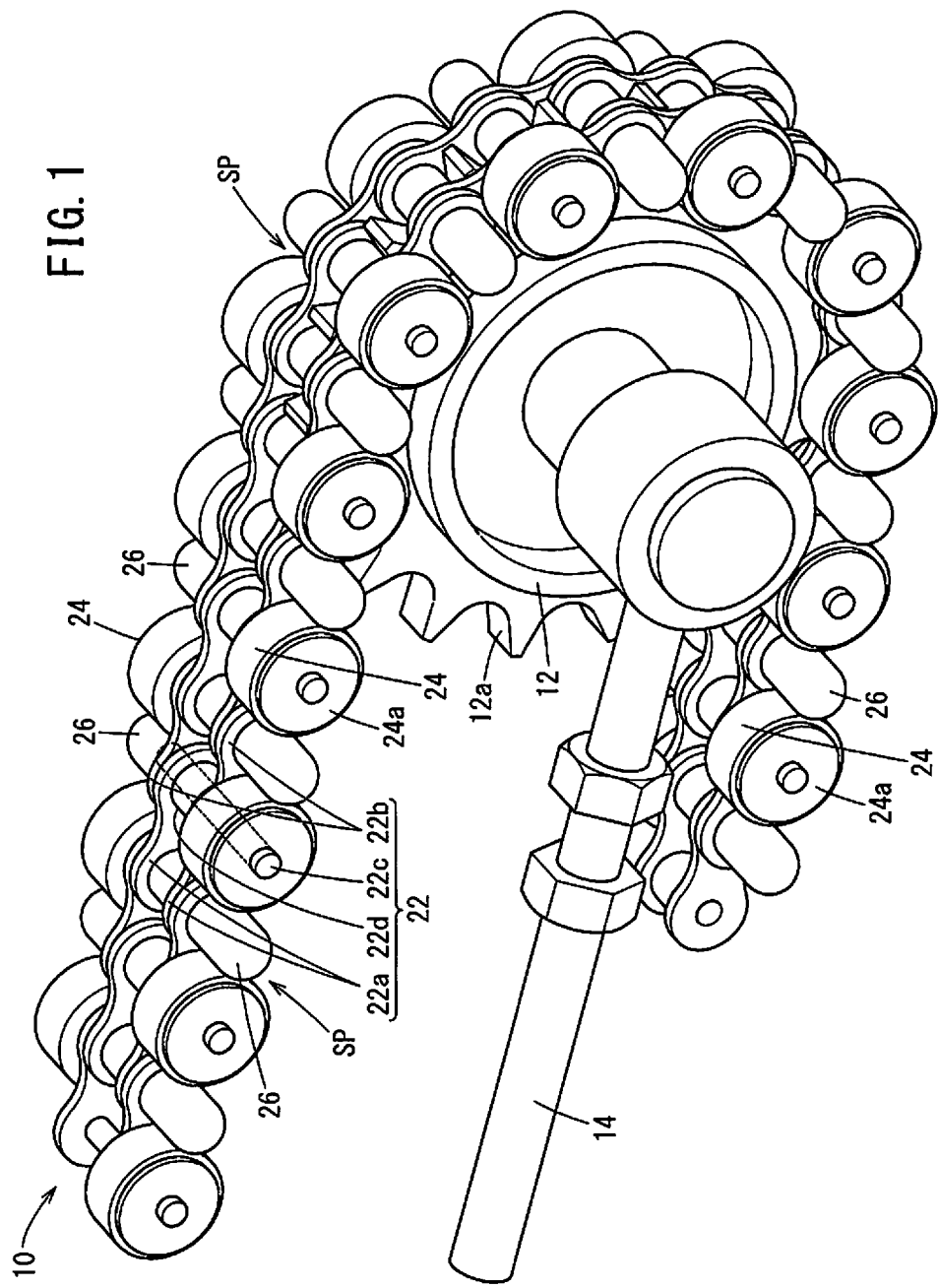
FIG. 1 is a schematic diagram showing a partial configuration of a staggered type conveyor chain according to an embodiment.

FIG. 1 is a schematic diagram showing a partial configuration of a staggered type conveyor chain 10 according to an embodiment. The staggered type conveyor chain 10 in the present embodiment is wound on a plurality of sprockets 12. In FIG. 1, for convenience, only part of the staggered type conveyor chain 10 with only one sprocket 12 is illustrated.

The sprocket 12 is provided with a tensioner 14 for adjusting the tension of the staggered type conveyor chain 10, and the staggered type conveyor chain 10 is wound around the sprocket 12 without any slack by the tensioner 14. In FIG. 1, for convenience, only part of the tensioner 14 is shown.

Figure 2:
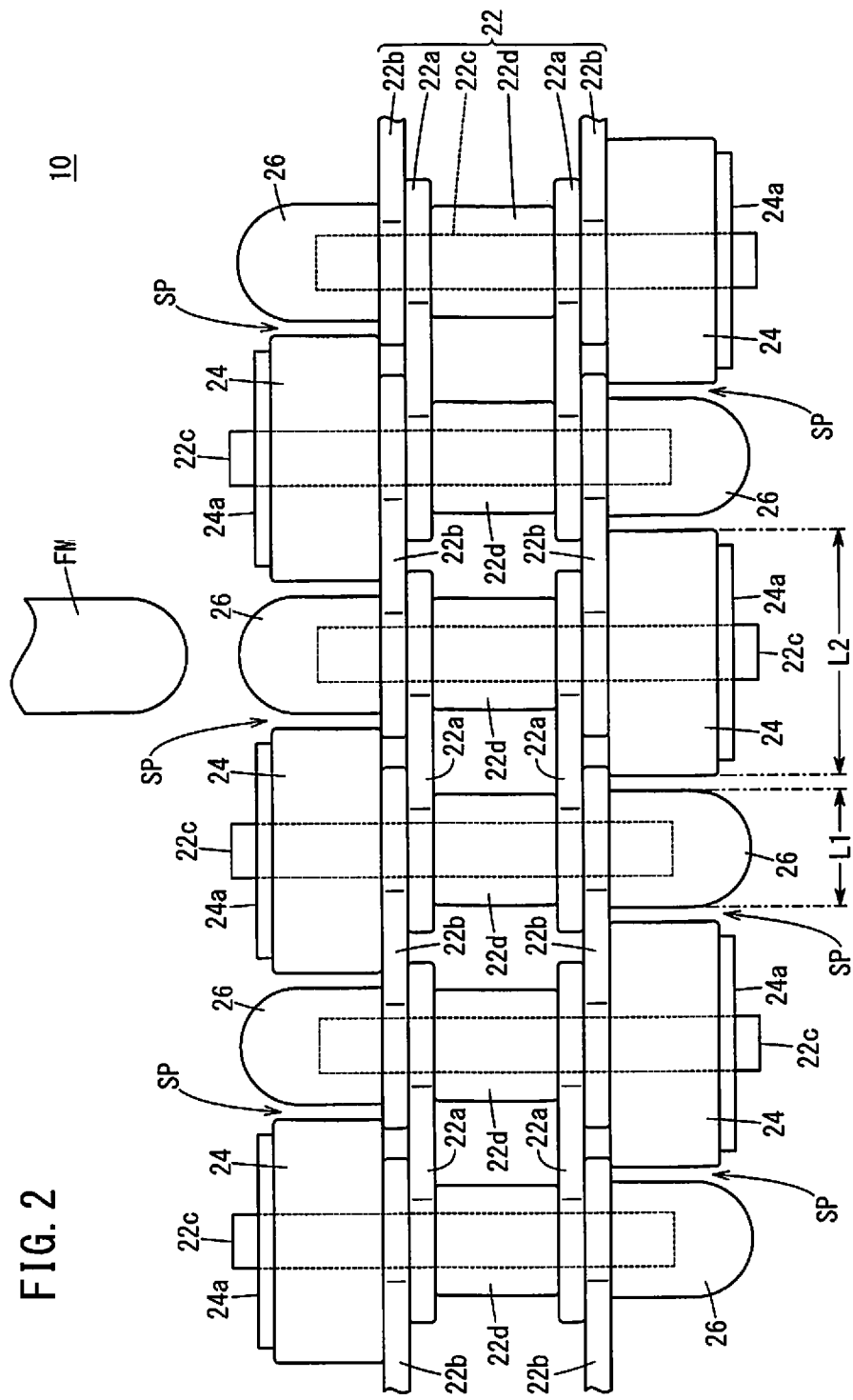
FIG. 2 is a top view of the staggered type conveyor chain of FIG. 1.

The staggered type conveyor chain 10 runs in conjunction with rotation of the sprocket 12 while meshing with teeth 12a of the sprocket 12. FIG. 2 is a top view of the staggered type conveyor chain 10. The staggered type conveyor chain 10 includes a chain 22, a plurality of side rollers 24 and a plurality of suppressing members 26, as major parts.

The chain 22 has a structure in which plural pairs of inner plates 22a and plural pairs of outer plates 22b are rotatably connected in series, extending in the serial direction, via plural connecting pins 22c.

Specifically, the inner plate 22a and the outer plate 22b are shifted in the serial direction so that the end portions thereof are overlapped with each other, and the connecting pin 22c is inserted through the overlapping end portions, so that the inner plate 22a and the outer plate 22b are connected in series. The connecting pins 22c are disposed at substantially regular intervals along the serial direction of the chain 22 and directed substantially orthogonal to the serial direction of the chain 22.

A tubular member 22d is provided between each pair of inner plates 22a so as to allow the connecting pin 22c to be inserted through and fix the relative position between the pair of inner plates 22a with respect to the width direction. The tubular members 22d are arranged at substantially regular intervals along the serial direction of the chain 22 so that the teeth 12a (see FIG. 1) of the sprocket 12 mesh with the gaps between the tubular members 22d.

The plural side rollers 24 are cushioning rollers for alleviating collision or the like between the chain 22 and a conveying body (not shown) placed on the chain 22, and are arranged along the serial direction of the chain 22, on both sides of the pair of the outer plates 22b in a staggered manner.

Each of these side rollers 24 is rotatably provided on the connecting pin 22c that extends outward from the outer plate 22b. More specifically, for example, a tubular bush 24a is fixed to the outer surface of the outer plate 22b, and the side roller 24 is attached so as to rotate over the outer circumferential surface of the bush 24a. The connecting pin 22c is inserted through the hole of the tubular bush 24a, and the end portion of the inserted connecting pin 22c is fixed to the bush 24a by a split pin or crimping or the like.

The plural suppressing members 26 prevent foreign material FM that interferes with the side rollers 24 from entering the spaces (or spacing) SP between the side rollers 24 neighboring with respect to the serial direction. Examples of the foreign material FM that enters the spaces SP between the side rollers 24 and interferes with the side rollers 24 include a finger of an operator or the working clothes and equipment the operator puts on and others.

The plural suppressing members 26 are arranged in a staggered manner on both sides of the chain 22 along the serial direction so that each of the suppressing members 26 is paired with the side roller 24 across the chain 22. That is, the suppressing member is arranged at the end portion of the connecting pin 22c opposite from the end portion where the side roller 24 is arranged. This end portion on the opposite side refers to the outer portion of the connecting pin 22c extending beyond the outer plate 22b.

In other words, in the connecting pin 22c, the end portion on the side where the side roller 24 is provided and the end portion on the side where the suppressing member 26 is provided alternate along the serial direction of the chain 22. Of the two longitudinal ends of the connecting pin 22c, the end portion where the side roller 24 is provided is called a first end portion of the connecting pin 22c, whereas the end portion where the suppressing member 26 is provided is called a second end portion of the connecting pin 22c.

Figure 3:
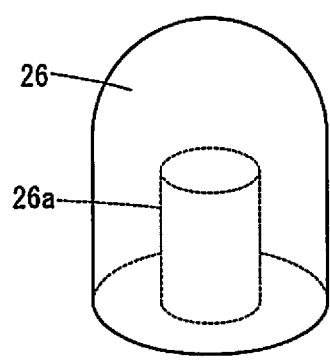
FIG. 3 is a schematic diagram showing the configuration of the suppressing member of FIG. 1.

FIG. 3 is a schematic diagram showing a configuration of the suppressing member 26. Each suppressing member 26 is, for example, a cap that covers the second end portion of the connecting pin 22c. That is, the suppressing member 26 has a bore 26a having an inside diameter slightly smaller than the outside diameter of the connecting pin 22c. The connecting pin 22c is press-fitted into the bore 26a so that the suppressing member 26 is fixed to the connecting pin 22c in a nonrotatable manner with respect to the connecting pin 22c. Although the material of the suppressing member 26 is not particularly limited, a material different from the metallic chain 22, for example, a resin or the like may be used.

Covering the second end portion of the connecting pin 22c, the suppressing member 26 can prevent the connecting pin 22c inserted through the outer plate 22b from falling out of the outer plate 22b. However, the second end portion of the connecting pin 22c may be fixed to the outer plate 22b by, for example, a split pin or crimping.

The thus configured suppressing members 26 prevent the foreign material FM that interferes with the side rollers 24 from entering the spaces SP between the neighboring side rollers 24 in the serial direction. Therefore, according to the staggered type conveyor chain 10 of the present embodiment, it is possible to prevent the chain from being stopped unintentionally.

Each suppressing member 26 in the present embodiment has a portion protruding outward beyond the side rollers 24. Therefore, it is possible to reliably prevent foreign material FM interfering with the side rollers 24 from entering the spaces SP between the side rollers 24, as compared to the case where there is no part projecting outward beyond the side rollers 24.

Further, the suppressing members 26 are not in contact with the neighboring side rollers 24 with respect to the serial direction of the chain 22. Therefore, it is possible to prevent the rotation of the side rollers 24 from being hindered by the suppressing members 26.

A dimension L1 of the suppressing member 26 in the serial direction of the chain 22 is smaller than a dimension L2 of the side roller 24 in the serial direction of the chain 22. Therefore, it becomes easier to bring the side rollers 24 adjacent to each other in the serial direction of the chain 22 close to each other.

VARIATIONAL EXAMPLES

Although the above embodiment has been described as an example of the present invention, the technical scope of the present invention should not be limited to the scope described in the above embodiment. It goes without saying that various modifications or improvements can be added to the above embodiment. It is clear from the description of the scope of the claims that modes with such modifications or improvements can be included in the technical scope of the present invention.

Part of the modified or improved forms will be described below as variational examples. Note that the same reference numerals are given to the same components as those described in the above embodiment, and repeated explanation is omitted.

Variational Example 1

Figure 4:
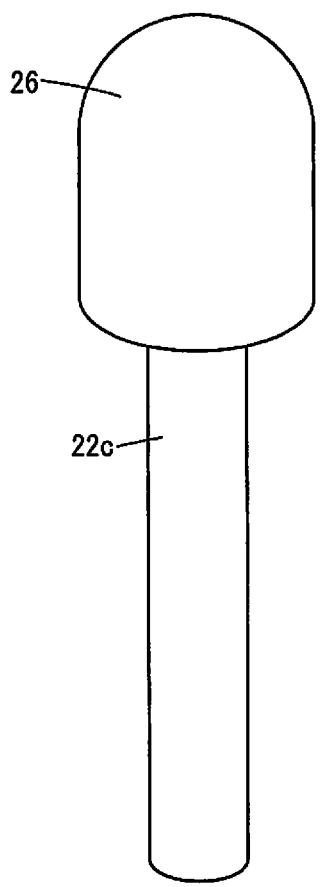
FIG. 4 is a schematic diagram showing a configuration of a suppressing member according to a variational example.

In the above embodiment, the suppressing member 26 is given as a cap that covers the second end portion of the connecting pin 22c. However, as shown in FIG. 4, the suppressing member 26 may be formed integrally with the connecting pin 22c as a pin head projecting radially outward from the outer circumferential surface of the connecting pin 22c.

Even if the suppressing member 26 is given as the pin head, it is possible to prevent foreign material FM interfering with the side rollers 24 from entering the space SP between the neighboring side rollers 24 in the serial direction, as in the above-described embodiment. Even if the suppressing member 26 is given as the pin head, it is possible to prevent the connecting pin 22c inserted through the outer plate 22b from falling out of the outer plate 22b, as in the above-described embodiment.

Variational Example 2

In the above embodiment, the suppressing member 26 is given as a cap that covers the second end portion of the connecting pin 22c. However, the suppressing member 26 may be a simple extended structure of the connecting pin 22c. This makes it possible to reduce the number of parts as compared with the case where the suppressing member 26 is given as a cap.

Variational Example 3

In the above embodiment, the suppressing member 26 has a portion protruding outward beyond the neighboring side rollers 24 located in the serial direction of the chain 22. However, the suppressing member 26 does not have to project outward beyond the side rollers 24 whilst it fits inside the space SP between the neighboring side rollers 24 located in the serial direction of the chain 22.

Nevertheless, in order to effectively suppress the foreign material FM interfering with the side rollers 24 from entering the space SP between the neighboring side rollers 24 in the serial direction, the tip of the suppressing member 26 is preferably located at a position outward beyond the midpoint of the width of the side roller 24. It is more preferable that at least part of the suppressing member 26 protrudes to outward beyond the neighboring side rollers 24 located in the serial direction of the chain 22.

Variational Example 4

In the above embodiment, the side rollers 24 on either side of the paired outer plates 22b are arranged every other pin, but may be arranged every three or more odd number of pins. Likewise, the suppressing members 26 on either side of the paired outer plates 22b are every one pin, but may be arranged every three or more odd number of pins.

Variational Example 5

Though in the above embodiment, no roller is provided on the outer circumferential side of the tubular member 22d disposed between the paired inner plates 22a, however, such a roller may be provided.

Variational Example 6

The above embodiment and variational examples 1 to 5 may be arbitrarily combined as long as no inconsistency occurs.

[Technical Ideas]

Technical ideas that can be grasped from the above embodiment and variational examples are described below.

The staggered type conveyor chain (10) includes: the chain (22) extending in a serial direction; the plurality of side rollers (24) arranged in a staggered manner on both sides of the chain (22) in the serial direction; and the plurality of suppressing members (26), each arranged to be paired with the side roller (24) across the chain (22) in a staggered manner on either side of the chain (22) in the serial direction, and configured to suppress entrance of foreign material (FM) interfering with the side rollers (24) into the space (SP) between the neighboring side rollers (24) with respect to the serial direction.

In this staggered type conveyor chain (10), the suppressing member (26) suppresses entrance of foreign material (FM) interfering with the side roller (24) into the space (SP) between the neighboring side rollers (24) in the serial direction. Therefore, it is possible to prevent the chain (22) from being stopped unintentionally.

The chain (22) may have a structure in which the plurality of pairs of inner plates (22a) and the plurality of pairs of outer plates (22b) are rotatably connected in series via the plurality of connecting pins (22c), and the suppressing member (26) may be arranged at the end portion of each of the connecting pins (22c) opposite from the end portion where the side roller (24) is arranged. This structure makes it possible to use a plate having the same shape as the inner plate (22a) or the outer plate (22b), as compared to the case where a suppressing member is provided on the outer plate (22b).

At least part of the suppressing member (26) may protrude outward beyond the neighboring side rollers (24). This configuration makes it possible to reliably prevent foreign material (FM) interfering with the side rollers (24) from entering the space (SP) between the neighboring side rollers (24) in the serial direction.

The dimension (L1) of the suppressing member (26) in the serial direction may be smaller than the dimension (L2) of the side roller (24) in the serial direction. This makes it easier to bring the neighboring side rollers (24) in the serial direction close to each other.

The suppressing member (26) may be fixed to the connecting pin (22c) in a nonrotatable manner with respect to the connecting pin (22c). This makes it easy to suppress the friction between the suppressing member (26) and the outer plate (22b).

The suppressing member (26) may be a cap that covers the end portion of the connecting pin (22c). This not only makes it possible to prevent foreign material (FM) interfering with the side rollers (24) from entering the space (SP) between the neighboring side rollers (24) in the serial direction, but also prevent the connecting pin (22c) from falling out of the outer plate (22b).

The suppressing member (26) may be formed integrally with the connecting pin (22c) as a pin head projecting radially outward from the outer circumferential surface of the connecting pin (22c). This not only makes it possible to prevent foreign material (FM) interfering with the side rollers (24) from entering the space (SP) between the neighboring side rollers (24) in the serial direction, but also prevent the connecting pin (22c) from falling out of the outer plate (22b). In addition, since the suppressing member (26) is formed integrally with the connecting pin (22c), the number of parts can be reduced.

What is claimed is:

1. A staggered type conveyor chain, comprising:
   a chain extending in a serial direction and having a structure in which a plurality of pairs of inner plates and a plurality of pairs of outer plates are rotatably connected in series via a plurality of connecting pins;
   a plurality of side rollers arranged in a staggered manner on both sides of the chain in the serial direction; and
   a plurality of suppressing members, each arranged to be paired with the side roller across the chain in a staggered manner on either side of the chain in the serial direction, and configured to suppress entrance of foreign material interfering with the side rollers into a space between the neighboring side rollers with respect to the serial direction, the suppressing member being arranged at an end portion of each of the connecting pins opposite from an end portion where the side roller is arranged, wherein the suppressing member is fixed to the connecting pin in a nonrotatable manner with respect to the connecting pin.

2. The staggered type conveyor chain according to claim 1, wherein at least part of the suppressing member protrudes outward beyond the neighboring side rollers.

3. The staggered type conveyor chain according to claim 1, wherein a dimension of the suppressing member in the serial direction is smaller than a dimension of the side roller in the serial direction.

4. The staggered type conveyor chain according to claim 1, wherein the suppressing member is a cap that covers the end portion of the connecting pin.

5. The staggered type conveyor chain according to claim 1, wherein the suppressing member is formed integrally with the connecting pin as a pin head projecting radially outward from an outer circumferential surface of the connecting pin.

6. A staggered type conveyor chain, comprising:
   a chain extending in a serial direction and having a structure in which a plurality of pairs of inner plates and a plurality of pairs of outer plates are rotatably connected in series via a plurality of connecting pins;
   a plurality of side rollers arranged in a staggered manner on both sides of the chain in the serial direction; and
   a plurality of suppressing members, each arranged to be paired with the side roller across the chain in a staggered manner on either side of the chain in the serial direction, and configured to suppress entrance of foreign material interfering with the side rollers into a space between the neighboring side rollers with respect to the serial direction, the suppressing member being arranged at an end portion of each of the connecting pins opposite from an end portion where the side roller is arranged, wherein the suppressing member is a cap that covers the end portion of the connecting pin.

7. The staggered type conveyor chain according to claim 6, wherein at least part of the suppressing member protrudes outward beyond the neighboring side rollers.

8. The staggered type conveyor chain according to claim 6, wherein a dimension of the suppressing member in the serial direction is smaller than a dimension of the side roller in the serial direction.

9. A staggered type conveyor chain, comprising:
a chain extending in a serial direction and having a structure in which a plurality of pairs of inner plates and a plurality of pairs of outer plates are rotatably connected in series via a plurality of connecting pins;
a plurality of side rollers arranged in a staggered manner on both sides of the chain in the serial direction; and
a plurality of suppressing members, each arranged to be paired with the side roller across the chain in a staggered manner on either side of the chain in the serial direction, and configured to suppress entrance of foreign material interfering with the side rollers into a space between the neighboring side rollers with respect to the serial direction, the suppressing member being arranged at an end portion of each of the connecting pins opposite from an end portion where the side roller is arranged, wherein the suppressing member is formed integrally with the connecting pin as a pin head projecting radially outward from an outer circumferential surface of the connecting pin.

10. The staggered type conveyor chain according to claim 9, wherein at least part of the suppressing member protrudes outward beyond the neighboring side rollers.

11. The staggered type conveyor chain according to claim 9, wherein a dimension of the suppressing member in the serial direction is smaller than a dimension of the side roller in the serial direction.

\* \* \* \* \*